US006625505B2

(12) United States Patent
Schmidt

(10) Patent No.: US 6,625,505 B2
(45) Date of Patent: Sep. 23, 2003

(54) VISUALIZATION SYSTEM FOR TECHNICAL PROCESS DATA

(75) Inventor: Gerhard Schmidt, Neumarkt (DE)

(73) Assignee: Siemens Aktiengesellschaft, Munich (DE)

( * ) Notice: Subject to any disclaimer, the term of this patent is extended or adjusted under 35 U.S.C. 154(b) by 50 days.

(21) Appl. No.: 10/058,330

(22) Filed: Jan. 30, 2002

(65) Prior Publication Data
US 2002/0116400 A1 Aug. 22, 2002

Related U.S. Application Data

(63) Continuation of application No. PCT/DE00/02070, filed on Jun. 26, 2000.

(30) Foreign Application Priority Data

Jul. 30, 1999 (DE) .................................. 299 13 057 U

(51) Int. Cl.[7] .............................................. G05B 15/00
(52) U.S. Cl. ............................... 700/83; 345/965
(58) Field of Search ............................ 700/17, 83, 9, 700/18, 86; 345/965, 970, 744

(56) References Cited

U.S. PATENT DOCUMENTS

| 5,200,744 A | | 4/1993 | Hiromoto et al. |
| 5,361,336 A | * | 11/1994 | Atchison ................... 345/970 |
| 5,386,360 A | | 1/1995 | Wilson et al. |
| 5,611,059 A | * | 3/1997 | Benton et al. ............... 700/83 |
| 5,706,455 A | | 1/1998 | Benton et al. |
| 5,726,883 A | * | 3/1998 | Levine et al. ............... 700/83 |
| 5,726,912 A | | 3/1998 | Krall, Jr. et al. |
| 5,752,039 A | | 5/1998 | Tanimura |
| 5,838,563 A | * | 11/1998 | Dove et al. ................. 700/83 |
| 5,903,455 A | | 5/1999 | Sharpe, Jr. et al. |
| 5,995,916 A | * | 11/1999 | Nixon et al. ................ 700/83 |
| 6,188,407 B1 | * | 2/2001 | Smith et al. ................ 345/970 |
| 6,559,773 B1 | * | 5/2003 | Berry ......................... 700/83 |

OTHER PUBLICATIONS

Hammerl A., "Protool—Cost–Cutting Configuration Software for All COROS Operator Panels", Engineering and Automation, Siemens Aktiengesellschaft, Berlin, Germany, vol. 18, NR. 3–4 (1996) pp. 6–7.

* cited by examiner

Primary Examiner—Ramesh Patel
Assistant Examiner—Edward F. Gain, Jr.
(74) Attorney, Agent, or Firm—Sughrue Mion, PLLC

(57) ABSTRACT

System containing an observation and/or operator's unit (OP) displaying and/or presenting process data (SPC3), and a projection unit (PPC) generating a projection data record (SPC1) which can be loaded into the observation and/or operator's unit via a data transmission link (DU1). The projection unit includes a first component (M1) which forms a differential data record (SPC5) when a projection data record (SPC1) is modified. The differential data record (SPC5) can be transmitted to the observation/operator's unit. In addition, the observation/operator's unit includes a second component (M2) which updates a loaded projection data record (SPC2) with the aid of a transmitted differential data record (SPC6).

12 Claims, 7 Drawing Sheets

VISUALIZATION SYSTEM FOR TECHNICAL PROCESS DATA

This is a Continuation of International Application PCT/DE00/02070, with an international filing date of Jun. 26, 2000, which was published under PCT Article 21(2) in German, and the disclosure of which is incorporated into this application by reference.

FIELD OF AND BACKGROUND OF THE INVENTION

Technical processes and facilities of all types, for example technical production operations such as welding facilities in the automobile industry, or technical processing operations such as refineries in the petroleum processing industry, are controlled with the aid of digital computing systems. Besides the industrial control units that actually control the particular process, there are numerous additional data processing units present that are predominantly used to display and/or specify process data. Such industrial observation/operator's units, sometimes also called "operator panels," are stand-alone data processing units. These units are connected to the industrial control unit used for process control, and allow process data for the control unit to be outputted and/or specified, usually in a very clear graphic form.

As a rule, the type of display and the available means for display and input, such as a so-called touch screen, a keyboard, and programmable control keys, to name a few examples, are programmed depending on the application and the type of associated technical process. It is especially important that the programming take into account which particular measured values are provided by the measured-value transmitters distributed in the technical process, and which control values must be provided by the industrial observation/operator's unit to the actuators distributed in the technical process.

Since the programming of industrial observation/operator's units is costly, and the observation/operator's units in an industrial facility are not available for programming but are instead required for operation of the facility, specialized projection units are provided. A quasi-offline projection data record can thus be generated that is tailored to the architecture and the characteristic features of the particular technical process. Furthermore, the special needs of the facility operator regarding suitability for observation/operation can be taken into account in the projection. Loading a completed projection data record into an observation/operator's unit allows the operating personnel to operate a technical process or facility in addition to supplementary control and regulation components in an optimized, individualized manner.

In many cases a projection data record is relatively extensive, since an abundance of graphical displays and technical data connections in particular between the technical process and an industrial control unit, as well as between the technical process and an observation/operator's unit, must be taken into consideration. Moreover, in the generation phase of a projection data record it is frequently the case that only minor adjustments need to be made. A simple case of such an adjustment is found when an additional measured-value transmitter has been installed in the technical facility. The additional measurement signal provided by this measured-value transmitter must be sent to the industrial control unit and processed by the unit's control program, and, in addition, the projection data record of an associated industrial observation/operator's unit, for example, must be adjusted so that the additional measured value is displayed in selected charts.

The problem thus arises that even after a minor adjustment in the projection unit, a projection data record must be fully reloaded into the associated observation/operator's unit in order to activate the changes, which is extremely time-consuming. In practice, a projection unit is often connected to an observation/operator's unit via a serial interface. Loading a projection data record via such a transmission link takes even more time.

OBJECTS OF THE INVENTION

An object of the invention is to provide a system which reduces the loading time required to transmit a projection data record from a projection unit to an observation/operator's unit.

SUMMARY OF THE INVENTION

According to one formulation of the invention, a system for visualizing technical process data, includes: a) a first transmission link for data, b) at least one industrial observation and/or operator's unit for displaying and/or specifying process data, and c) a projection unit for generating a projection data record which can be loaded via the first transmission link into the observation and/or operator's unit, for at least influencing the display and/or the specification of process data. In the system according to the invention, a projection unit further includes a component which forms a differential data record when a projection data record is modified. This differential data record can be transmitted to the observation and/or operator's unit via a first data transmission link. In addition, the observation and/or operator's unit includes a component which updates a loaded projection data record with the aid of a transmitted differential data record.

An advantage of the invention is that a projection data record, particularly after only minor adjustments, need not be completely transmitted to an observation and/or operator's unit. Transmission of only those differential data records containing modifications takes significantly less time. Even further time-savings can be realized by updating only the affected parts of the projection data record on the part of the observation and/or operator's unit. In contrast, complete replacement of a projection data record is considerably more costly and, in a sense, is comparable to the installation of a new operating system.

BRIEF DESCRIPTION OF THE DRAWINGS

The invention and further advantageous embodiments are explained in more detail with reference to the block diagrams in the figures, which are briefly described below.

DETAILED DESCRIPTION OF THE PREFERRED EMBODIMENTS

Figure 1:
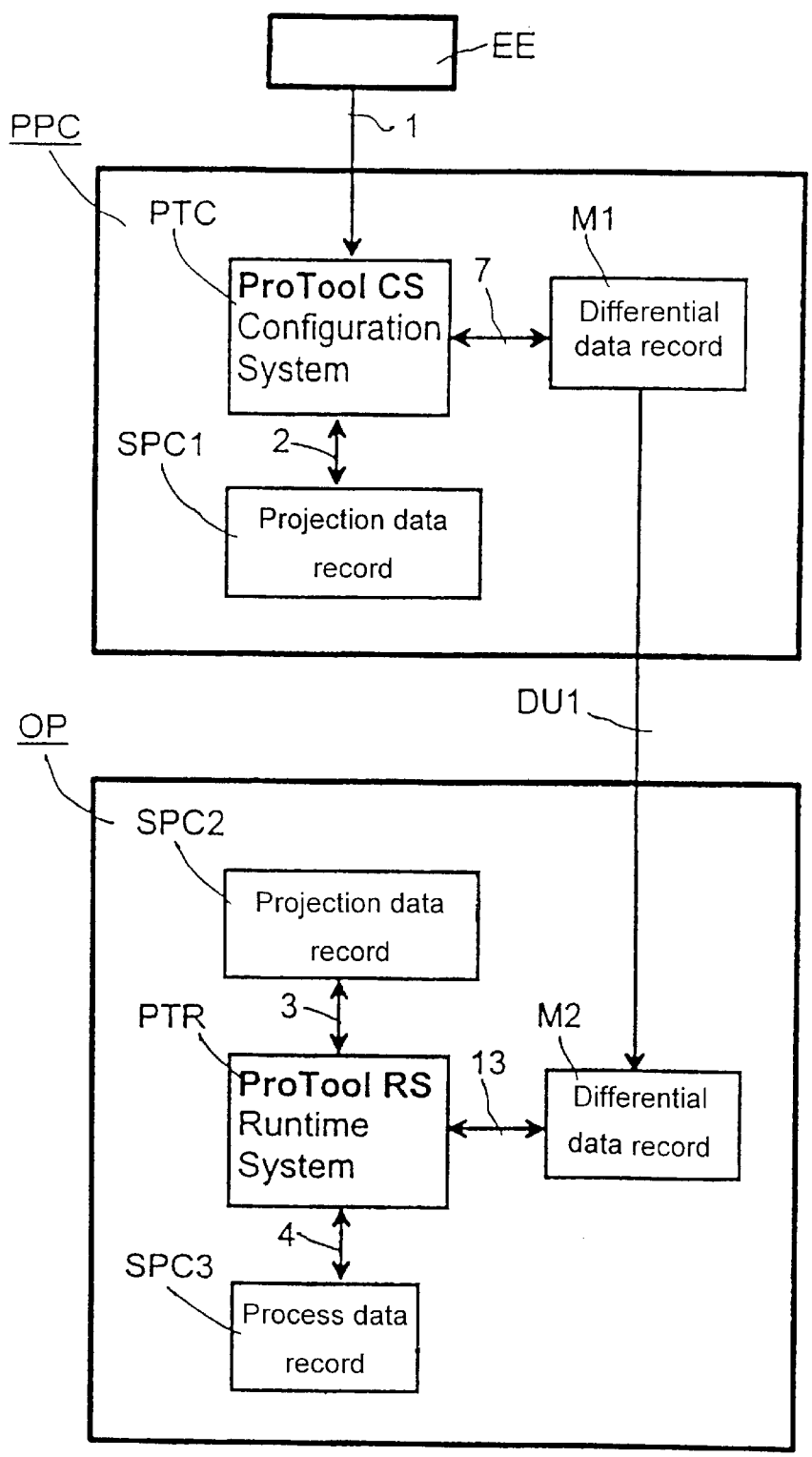
FIG. 1 shows the elementary block diagram of a system designed according to the invention, shown in an offline mode, as an example.

FIG. 1 shows an example of an industrial observation and/or operator's unit OP. This unit serves to display and/or specify process data stored in a memory SPC3, for example. The process data, especially in the form of display and/or control values, are capable of representing an image of actual process data and being externally loaded into memory SPC3. In the example of FIG. 1, the observation and/or operator's unit OP is not directly connected to the associated technical process. The represented embodiment of the inventive system, therefore, is in a type of offline mode.

In the example of FIG. 1, the observation and/or operator's unit OP is run by a control program PTR. This control program links a projection data record stored in a memory SPC2 with current process data stored in memory SPC3. Process images and graphic display schematics, for example, which are thus generated by the projection data record are loaded from memory SPC3 to complete the display with current process data. It is advantageous if the control program PTR that links the projection data and the process data is a program based on ProTool RS: Run Time System software. For the sake of clarity, the elements which provide for the direct physical display or operation of process data, comprising for example a screen display, keyboard, and programmable key elements, to name a few, are not represented in FIG. 1. The observation and/or operator's unit can in particular be a so-called operator panel.

FIG. 1 further shows an example of a projection unit PPC which serves to generate a projection data record that can be stored in a memory SPC1. The projection unit PPC is run by a projection program PTC, which can be run, for example, via external operating means such as a keyboard EE that is connected to the projection unit PPC via a cable 1. The projection program PTC enables a large variety of graphic objects, such as interactive process images and pie charts, to name a few, to be generated depending on the application. It is advantageous for the projection program PTC to be a program that is based on ProTool CS: Configuration System software.

In the example of FIG. 1, a completed projection data record can be loaded via a first transmission link DU1 from the projection unit PPC into the observation and/or operator's unit OP, where the projection data record influences at least the display and/or the specification options for the process data.

According to the invention, the projection unit PPC comprises first means M1 which form a differential data record SPC5 when a projection data record SPC1 is modified. This differential data record can be transmitted to the observation and/or operator's unit OP via the first transmission link DU1, using automatic or manual controls, for example. Furthermore, the observation and/or operator's unit comprises second means M2 which update a loaded projection data record SPC2, using a transmitted differential data record.

Figure 2:
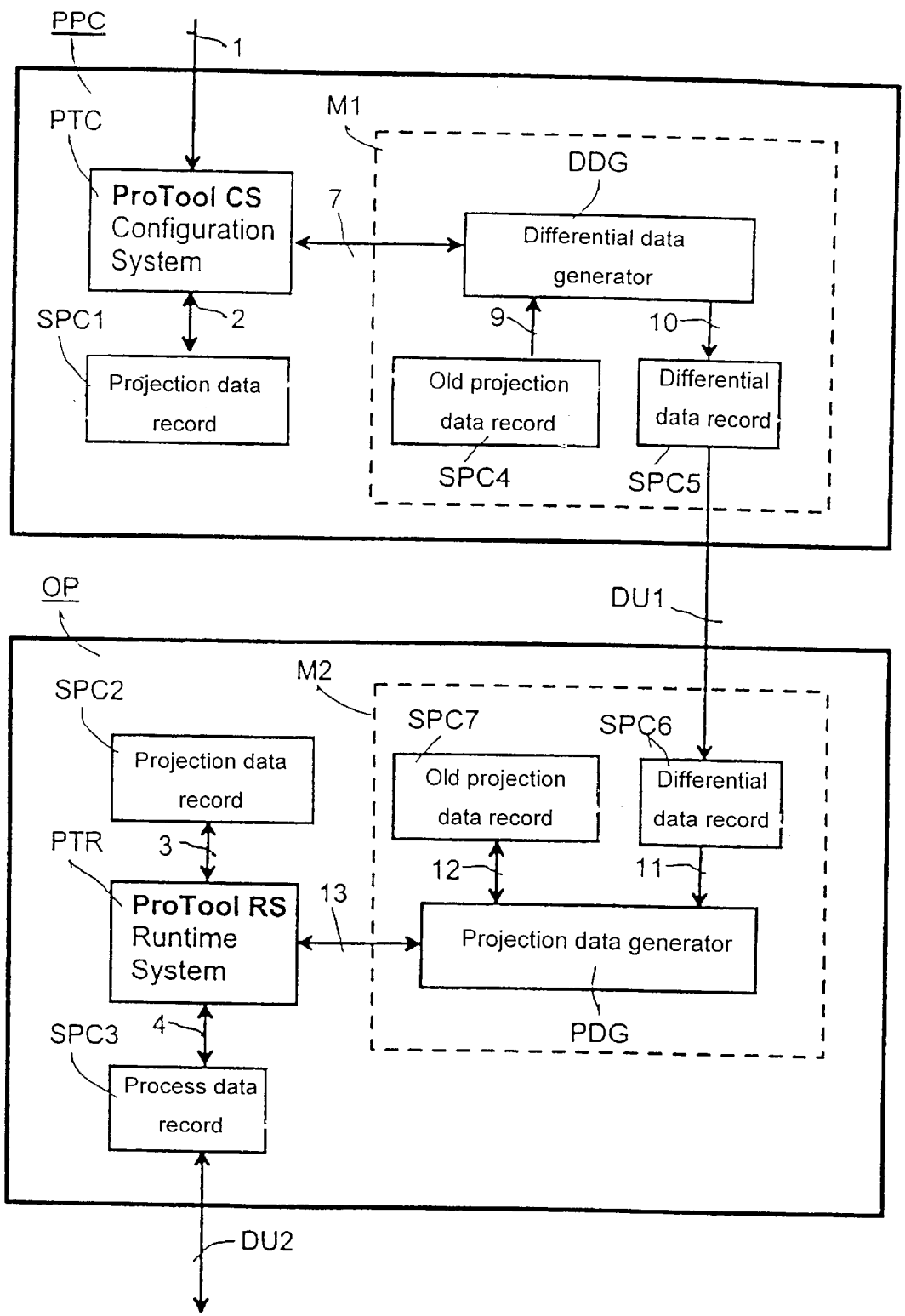
FIG. 2 shows the elementary block diagram of a preferred further embodiment of the inventive system.

Advantageous embodiments of first means M1 of the projection unit PPC and of second means M2 of the observation and/or operator's unit OP of the inventive system are represented in FIG. 2.

First means M1 comprise a differential data generator which forms a differential data record when the projection data record SPC1 is modified, and stores the differential data record in a memory SPC5. The differential data generator DDG is preferably run by the projection program PTC via a data link 7, or the differential data generator itself is a component of this control program PTC. The differential data record is preferably formed by comparing the modified projection data record from memory SPC1 to a previous version of the projection data record temporarily stored in SPC4, that is, a so-called old projection data record.

This differential data record is transmitted via DU1 to second means M2 in the observation and/or operator's unit OP, where it is stored in a memory SPC6, for example. Second means M2 further comprise a projection data generator PDG. This projection data generator updates the copy of the projection data record of the observation and/or operator's unit OP, stored in memory SPC2, for example, by comparing the transmitted differential data record from memory SPC5 to a previous version of the projection data record temporarily stored, that is, a so-called old projection data record. It is advantageous if the projection data generator PDG is also run by software and represents a part of the control program PTR.

Figure 3:
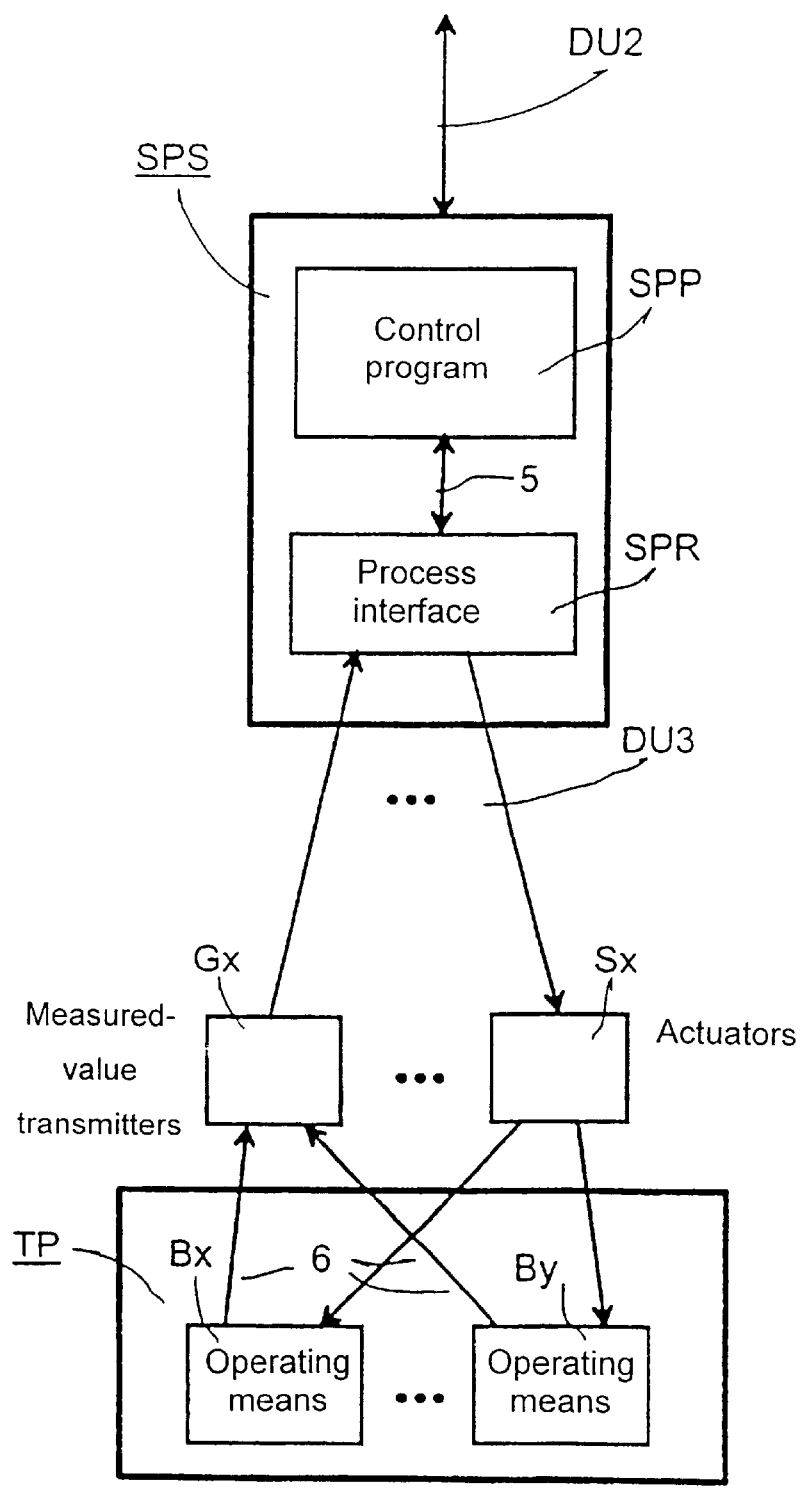
FIG. 3 shows an example of supplementary components of the inventive system for enabling an online mode.

Advantageous supplementary components of the inventive system which enable an online system mode are explained with reference to FIG. 3. These supplementary components comprise an industrial control unit SPS which on the one hand exchanges process data with a technical process TP via a third transmission link DU3, and on the other hand exchanges process data with at least one observation and/or operator's unit OP via a second transmission link DU2.

The technical process TR comprises a plurality of technical operating means Bx, By which may comprise adjustable drives and measured-value transmitters, to name a few. Measured-value transmitters Gx for determining current actual values such as rotational speeds, temperatures, and so forth, in addition to actuators Sx for outputting control values, are assigned to these technical operating means.

Output values such as actuating signals, as well as input values such as measured and actual values, are included here under the term "process data." Process data from the industrial control unit SPS are exchanged in the technical process via a process interface SPR and a third data transmission link DU3 in real time, as described above. In addition, these process data in a possibly adapted form—for example, as display or control values—are exchanged with the observation and/or operator's unit OP via the second data transmission link.

First means M1 for forming a differential data record SPC5 preferably evaluate modifications to a projection data record SPC1 in binary form. In addition, second means M2 for updating a projection data record SPC2 evaluate a transmitted differential data record SPC6, likewise in binary form. This has the advantage that logical evaluations of data content are not necessary, either during generation of a differential data record on the part of a projection unit, or during updating of a projection data record on the part of an observation and/or operator's unit. Moreover, it is sufficient to operate only with partial data in binary-coded form.

To facilitate access to the relevant bit combinations during generation or updating, it is advantageous if a differential data record SPC5 or SPC6 comprises at least the starting and ending addresses of such binary-coded partial data, especially the starting and ending addresses of memory areas.

This is discussed in more detail below, with reference to the data areas represented in FIGS. 4 through 7.

FIGS. 4 through 7 in their left regions show examples of the contents of memories SPC4 or SPC7 comprising an original or old projection data record, that is, the state of the memory before a modification.

In addition, FIGS. 4 through 7 in their right regions show the contents of memories SPC1 or SPC2 comprising an updated projection data record, that is, the state of the memory after a modification.

Finally, FIGS. 4 through 7 in their lower regions show the contents of memories SPC5 or SPC6 comprising a differential data record, that is, the data necessary for updating a projection data record.

Figure 4:
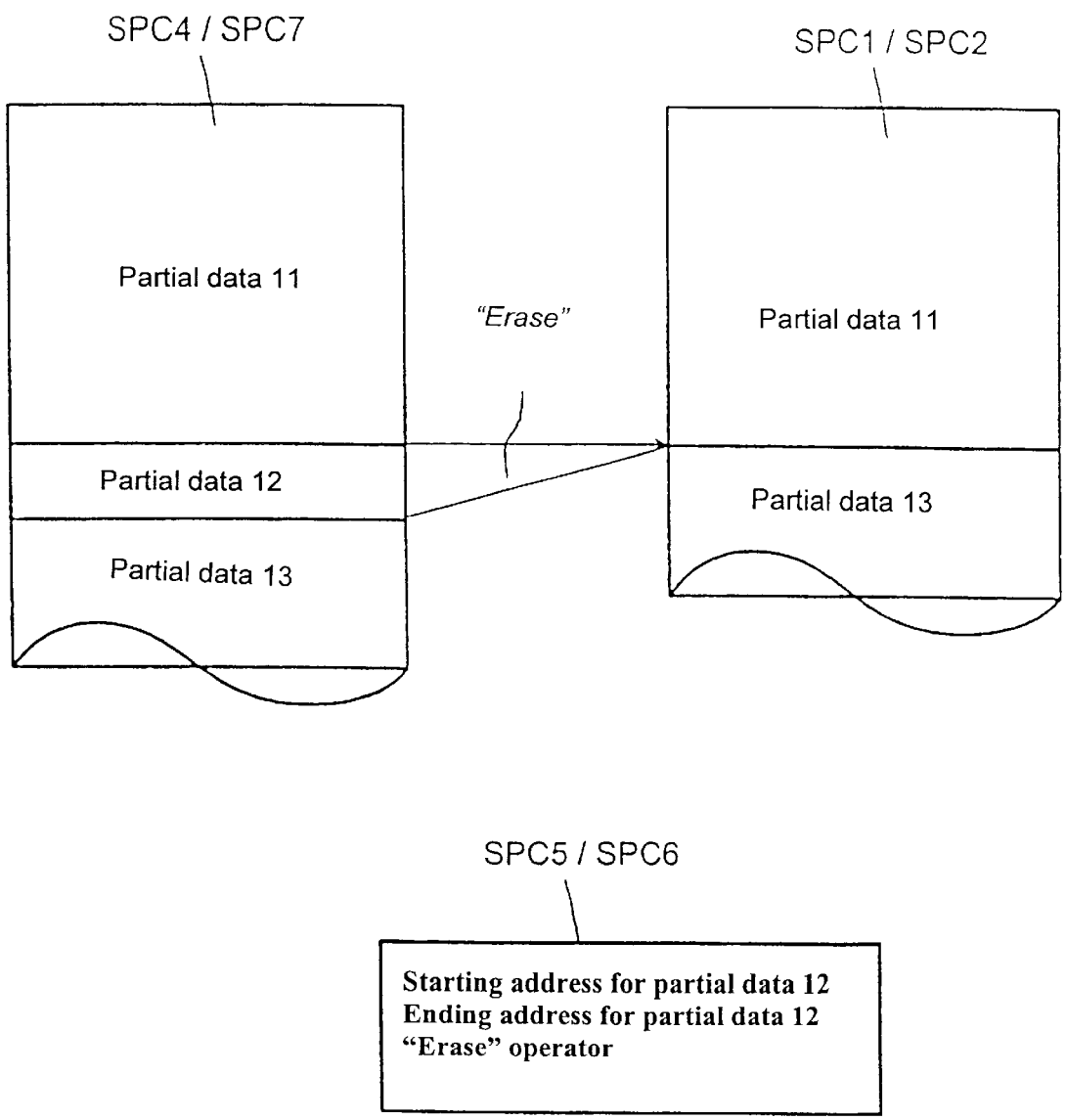
FIG. 4 shows the formation of a differential data record according to the present invention, using the erasure of partial data in a projection data record, as an example.

FIG. 4 shows the formation of a differential data record, using the erasure of partial data in a projection data record as an example.

The original or old projection data record comprises partial data 11, 12, and 13. It will be assumed here that updating requires the partial data 12 to be erased. A differential data record which enables the projection data generator to perform the desired updating preferably contains the starting and ending addresses of the partial data 12 to be erased, as well as an operator that identifies the erasure process.

Figure 5:
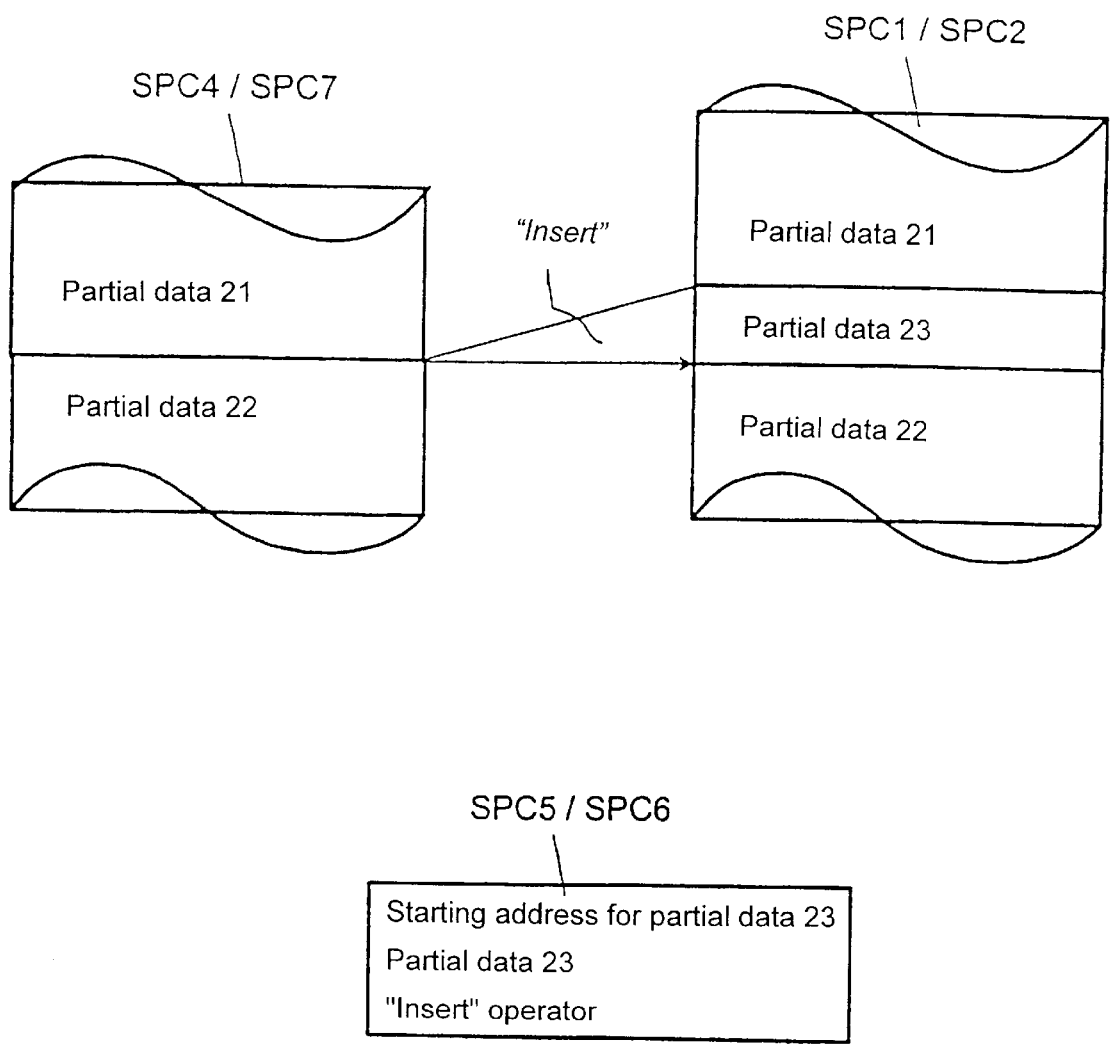
FIG. 5 shows the formation of a differential data record according to the present invention, using the insertion of new partial data in a projection data record, as an example.
Figure 6:
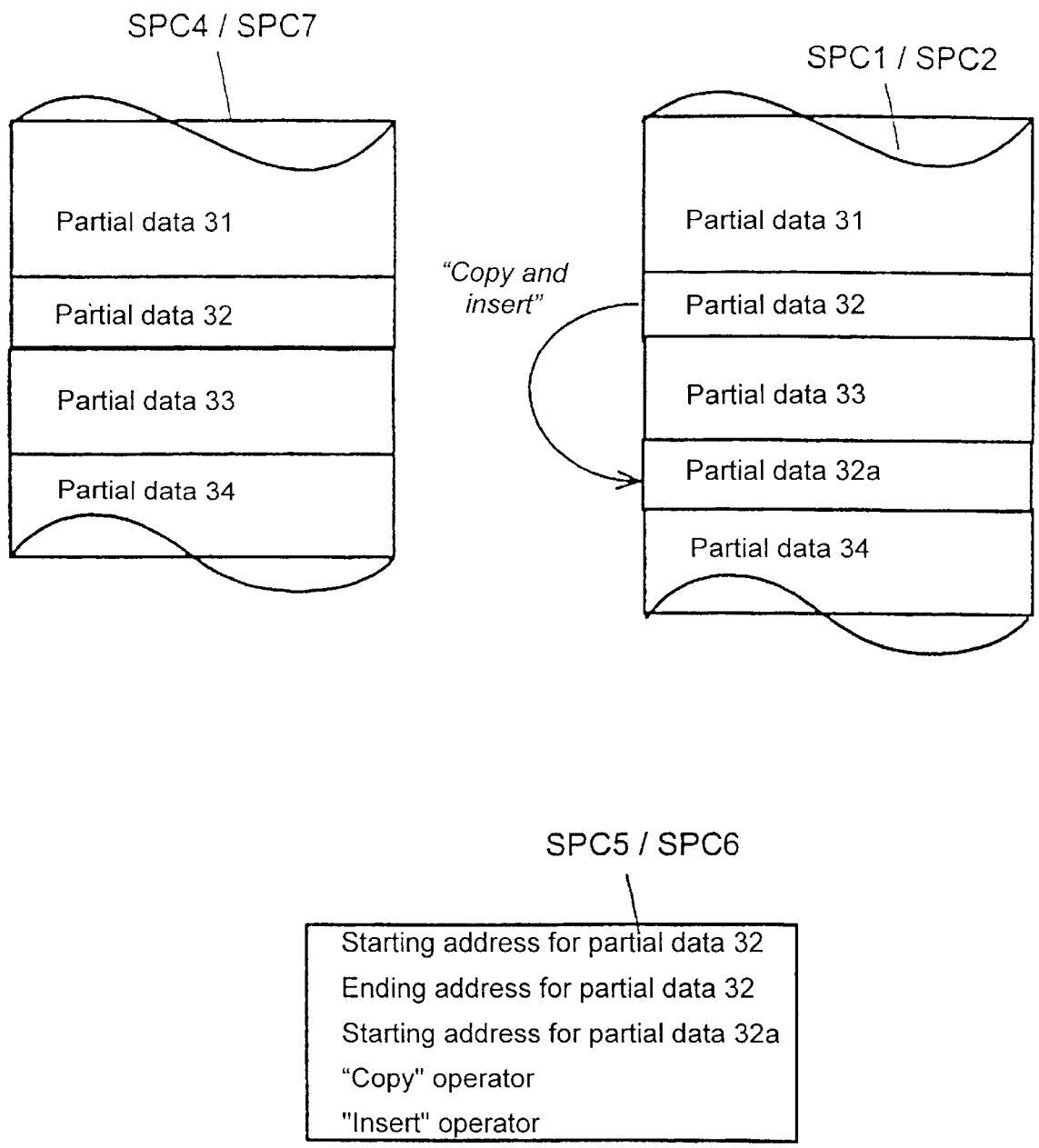
FIG. 6 shows the formation of a differential data record according to the present invention, using the copying and reinsertion of partial data in a projection data record, as an example.
Figure 7:
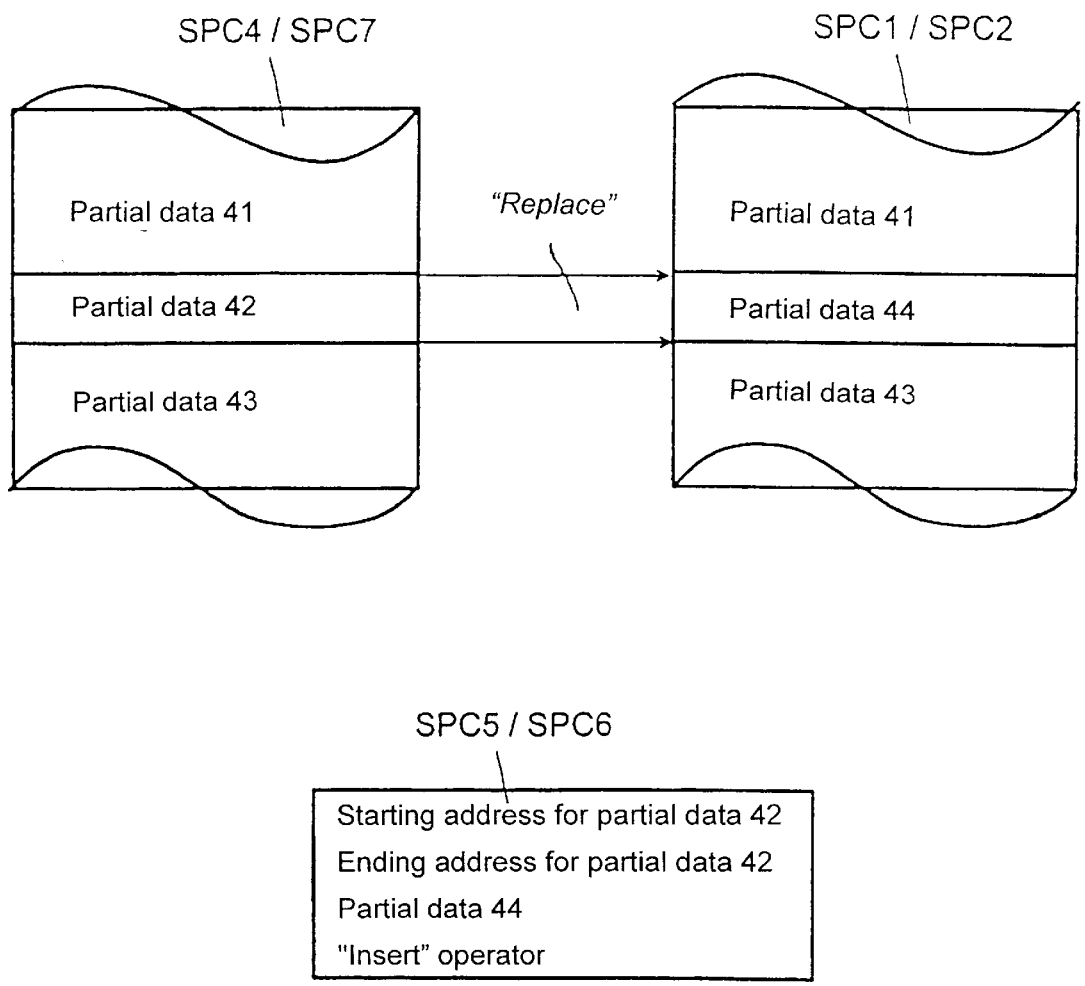
FIG. 7 shows the formation of a differential data record according to the present invention, using the replacement of partial data by updated partial data in a projection data record, as an example.

FIG. 5 shows the formation of a differential data record, using the insertion of new partial data in a projection data record as an example.

The original or old projection data record comprises partial data 21 and 22. It will be assumed here that updating requires new partial data 23 to be inserted. A differential data record which enables the projection data generator to perform the desired updating preferably contains the starting addresses of the partial data 23 to be inserted, that is, the insertion address, the new partial data 23 itself, and an operator that identifies the insertion process.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. System for at least the visualization of technical process data, comprising:
   a) a first transmission link for data (DU1),
   b) at least one industrial observation and/or operator's unit (OP) for displaying and/or specifying process data (SPC3), and
   c) a projection unit (PPC) for generating a projection data record (SPC1) which can be loaded via the first transmission link (DU1) into the observation and/or operator's unit (OP), for at least influencing the display and/or the specification of process data (SPC3), wherein:
   the projection unit (PPC) comprises first means (M2) which form a differential data record (SPC5) when a projection data record (SPC1) is modified, and said differential data record can be transmitted to the observation and/or operator's unit (OP) via the first data transmission link (DU1), and
   the observation and/or operator's unit (OP) comprises second means (M2) which update a loaded projection data record (SPC2) with the aid of a transmitted differential data record (SPC6).

2. System according to claim 1, wherein the industrial observation and/or operator's unit (OP) for displaying and/or specifying process data (SPC3) comprises an operator panel.

3. System according to claim 1, wherein the first means (M1) of the projection unit (PPC) comprise a differential data generator (DDG) which, when the projection data record (SPC1) is modified, forms the differential data record (SPC5) by comparing to a stored projection data record (SPC4).

4. System according to claim 3, wherein the projection unit (PPC) comprises a control program (PTC)(ProToolCS), and the differential data generator (DDG) is a part of the control program (PTC).

5. System according to claim 1, wherein the second means (M2) of the observation and/or operator's unit (OP) comprise a projection data generator (PDG) which updates the projection data record (SPC2) by comparing a transmitted differential data record (SPC5) to a stored projection data record (SPC7).

6. System according to claim 5, wherein the observation and/or operator's unit (OP) comprises a control program (PTR)(ProToolRS), and the projection data generator (PDG) is a part of the control program (PTR).

7. System according to claim 1, further comprising:
   a) a second and third transmission link for data (DU2, DU3), and
   b) an industrial control unit (SPS) which
   b1) exchanges process data (Gx, Sx) with a technical process (TP) via the third transmission link (DU3), and
   b2) exchanges process data (SPC3) with at least one observation and/or operator's unit (OP) via the second transmission link (DU2) (SPR).

8. System according to claim 1, wherein the first means (M1) for forming a differential data record (SPC5) evaluate modifications to a projection data record (SPC1) in binary form.

9. System according to claim 1, wherein the second means (M2) for updating a projection data record (SPC2) evaluate a transmitted differential data record (SPC6) in binary form.

10. System according to claim 1, wherein a differential data record (SPC5) contains at least binary starting and ending addresses, especially of memory areas.

11. System according to claim 1, wherein a differential data record (SPC5) contains at least partial data in binary-coded form.

12. A system for visualizing technical process data, comprising:
   a) a first transmission link for data,
   b) at least one interface unit at least either displaying or specifying process data, and
   c) a projection unit generating a projection data record which is loaded via the first transmission link into the interface unit, influencing the display or the specification of the process data, wherein:
   the projection unit comprises a first component which forms a differential data record when a projection data record is modified, and transmits the differential data record to the interface unit via the first transmission link, and
   the interface unit comprises a second component which updates a loaded projection data record in accordance with the transmitted differential data record.

* * * * *